US008359722B2

(12) United States Patent
Polizzi

(10) Patent No.: US 8,359,722 B2
(45) Date of Patent: Jan. 29, 2013

(54) MAGNETIC REPAIR KIT FOR LATCHES AND MAILBOX LATCH REPAIR METHOD

(76) Inventor: Andre Claude Polizzi, Belmont, MI (US)

( * ) Notice: Subject to any disclaimer, the term of this patent is extended or adjusted under 35 U.S.C. 154(b) by 194 days.

(21) Appl. No.: 13/008,698

(22) Filed: Jan. 18, 2011

(65) Prior Publication Data

US 2011/0173792 A1 Jul. 21, 2011

Related U.S. Application Data

(60) Provisional application No. 61/295,816, filed on Jan. 18, 2010.

(51) Int. Cl.

| | |
|---|---|
| ***B23P 6/00*** | (2006.01) |
| ***A47G 29/12*** | (2006.01) |
| ***E05C 17/56*** | (2006.01) |

(52) U.S. Cl. ............... 29/402.01; 29/402.08; 29/525.01; 29/525.02; 29/525.11; 232/45; 292/251.5

(58) Field of Classification Search ............... 29/402.01, 29/402.08, 525.01, 525.02, 525.11; 292/251.1, 292/80, 81, 87, DIG. 63, 1, 340, 340.15; 232/45, 17, 44

See application file for complete search history.

(56) References Cited

U.S. PATENT DOCUMENTS

| | | | | |
|---|---|---|---|---|
| 1,933,126 | A * | 10/1933 | Slattery | 70/276 |
| 5,645,215 | A * | 7/1997 | Marendt et al. | 232/17 |
| 6,658,697 | B2 | 12/2003 | Liao | |
| 6,808,108 | B1 * | 10/2004 | Turnbow et al. | 232/29 |
| 6,827,255 | B2 * | 12/2004 | Jenkins et al. | 232/29 |
| 7,393,027 | B1 | 7/2008 | Chen | |
| 7,527,190 | B1 | 5/2009 | Bowers | |

* cited by examiner

*Primary Examiner* — Jermie Cozart

(74) *Attorney, Agent, or Firm* — Law Office of Mark Brown, LLC; Mark E. Brown

(57) ABSTRACT

A mailbox door latch retrofitting kit that uses a magnet attached to the interior of the mailbox to magnetically engage the door of a mailbox, or to magnetically engage a metal disk attached to the door of a mailbox. The kit includes a magnet attached to a bracket which is secured to the inside of a mailbox in a manner to permit the magnet to contact the mailbox door. The magnet secures the door of a ferrous-containing mailbox closed. For non-ferrous containing mailboxes, an optional ferrous-containing disk or flat washer is secured to the inside of the mailbox door using double sided tape and aligned for engagement with the magnet.

6 Claims, 5 Drawing Sheets

MAGNETIC REPAIR KIT FOR LATCHES AND MAILBOX LATCH REPAIR METHOD

This application claims priority in U.S. Provisional Patent Application No. 61/295,816 filed Jan. 18, 2010, which is incorporated herein by reference.

BACKGROUND OF THE INVENTION

1. Field of the Invention

The present disclosed technology relates generally to securing devices, and in particular a magnetic door latch repair kit and method for a residential mailbox.

2. Description of the Related Art

Residential and other exterior mailboxes are typically mounted on elevated supports, such as posts. A common type of mailbox includes an elongated body with a hinged door that folds down during mail drop-off and pickup. The door is commonly secured when closed at the top by a latch mounted on the mailbox body. The latch may be of plastic or metal construction. Over time the latch may become broken or ineffective due to use and/or exposure to the atmosphere. Broken or ineffective latches prevent the door from remaining closed or allow the door to be opened by the wind. An unintentionally opened mailbox can expose the contents to damage from the elements, becoming lost, being carried away by the wind or being an easy target for theft. What is needed is a magnetic latch repair kit and mailbox latch repair method for replacing or supplementing existing mailbox latches.

In rural areas, roadside mailboxes are often located some distance from the farmhouses and other residences that they serve. Moreover, rural area mailboxes are typically exposed to the elements, and are thus susceptible to rust, corrosion and ultraviolet radiation damage, all of which can render the original mailbox door latches ineffective, with consequent loss of mail items.

Heretofore there has not been available a magnetic latch repair kit and mailbox latch repair method with the advantages and features of the disclosed subject matter.

SUMMARY OF THE INVENTION

A mailbox door latch repair kit is provided that uses a magnet attached to the interior of the mailbox to magnetically engage the metallic door of a ferrous-containing mailbox, or to magnetically engage a metal disk or flat washer attached to the door of a non-ferrous or non-metallic door of a mailbox. The kit includes a magnet attached to a bracket which is secured to the inside of a mailbox in a manner to permit the magnet to contact the mailbox door. The magnet secures the door of a ferrous-containing mailbox closed. For non-ferrous containing mailboxes, an optional ferrous-containing disk or flat washer is secured to the inside of the mailbox door using double sided tape and aligned for engagement with the magnet.

BRIEF DESCRIPTION OF THE DRAWINGS

The drawings constitute a part of this specification and include exemplary embodiments of the disclosed subject matter illustrating various objects and features thereof, wherein like references are generally numbered alike in the several views.

DESCRIPTION OF THE PREFERRED EMBODIMENT

I. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inward" and "outward" refer to directions toward and away from, respectively, the geometric center of the aspect being described and designated parts thereof. Said terminology will include the words specifically mentioned, derivatives thereof and words of similar meaning.

II. Embodiment or Aspect of the Door Latch Repair Kit 2.

Figure 1:
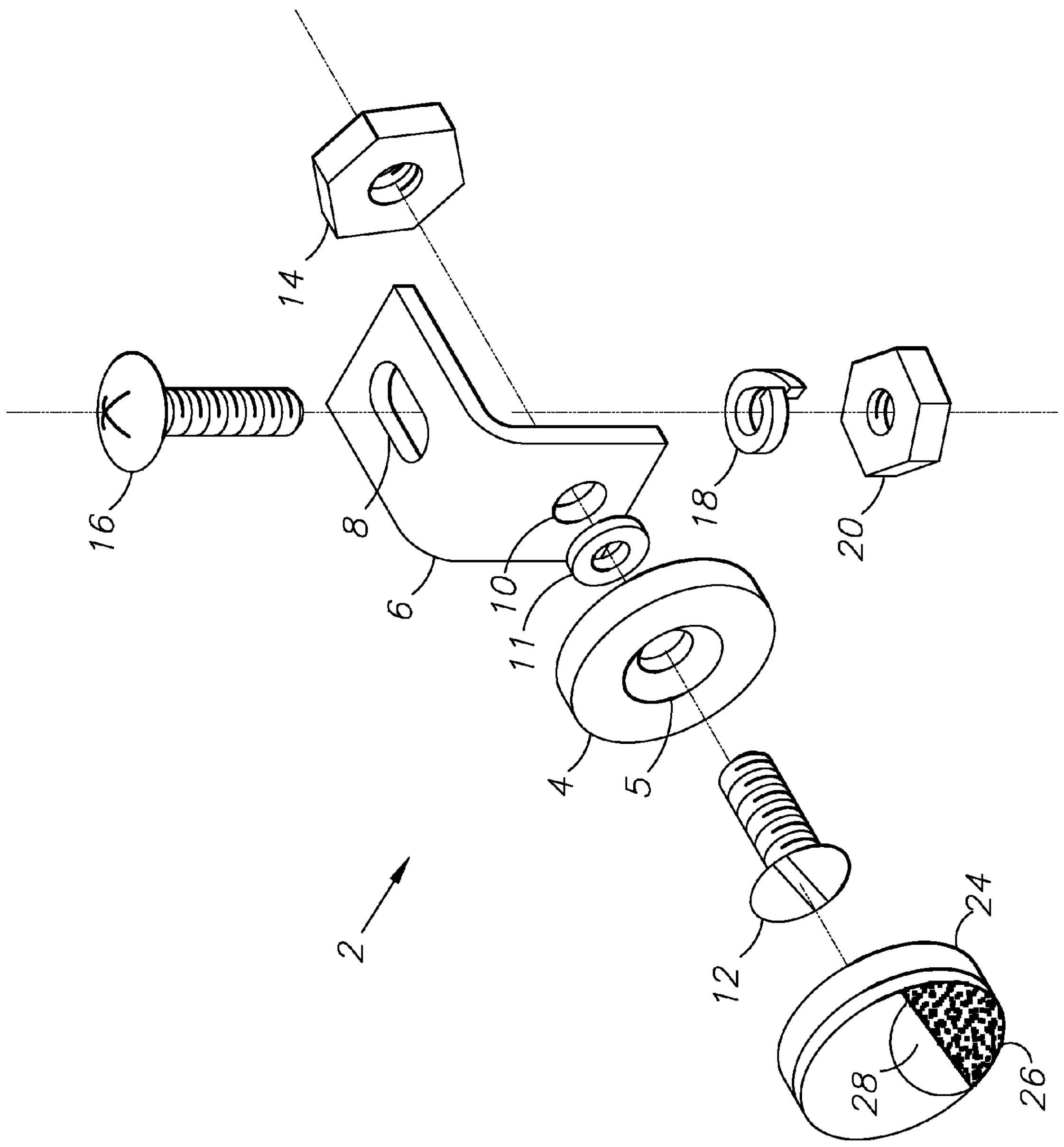
FIG. 1 is an exploded view of a magnetic door latch repair kit, embodying an aspect of the present invention.

Referring to the drawings in more detail, the reference numeral 2 generally designates a door latch repair kit embodying the principles of the disclosed subject matter. Referring to FIG. 1, the kit 2 includes a right angle bracket 6 manufactured from a resilient material including, but not limited to, stainless steel or aluminum. The bracket 6 is used to attach a magnet to an inner surface 65 of a body 54 of a mailbox 52. The magnet 4 is attached to one portion of the bracket 6 by passing a threaded member, such as a machine screw 12, through a receiver 5 in the magnet 4 and the receiver 10 in the bracket 6, and securing them with a threaded receiver such as a nut 14. An optional flat washer 11 may be placed between the magnet 4 and receiver 10 on the screw 12. The head of the screw 12 does not prevent proper engagement of the magnet 4 with the contact surface (described below). The bracket 6 is attached within the opening 64 of the body 54 of a mailbox 52 by passing a threaded member, such as a screw 16, through an elongated slot 8 in the other portion of the bracket 6, a receiver 68 in the body 54, and a lock washer 18, and securing them with a threaded receiver such as a nut 20. The receiver 68 is located to permit alignment of the magnet 4 with the inner face 84 of a mailbox 52 door 80 by sliding the bracket 6 along the length of the slot 8, and permitting the magnet 4 to extend beyond the opening 64 of the body 54.

Figure 2:
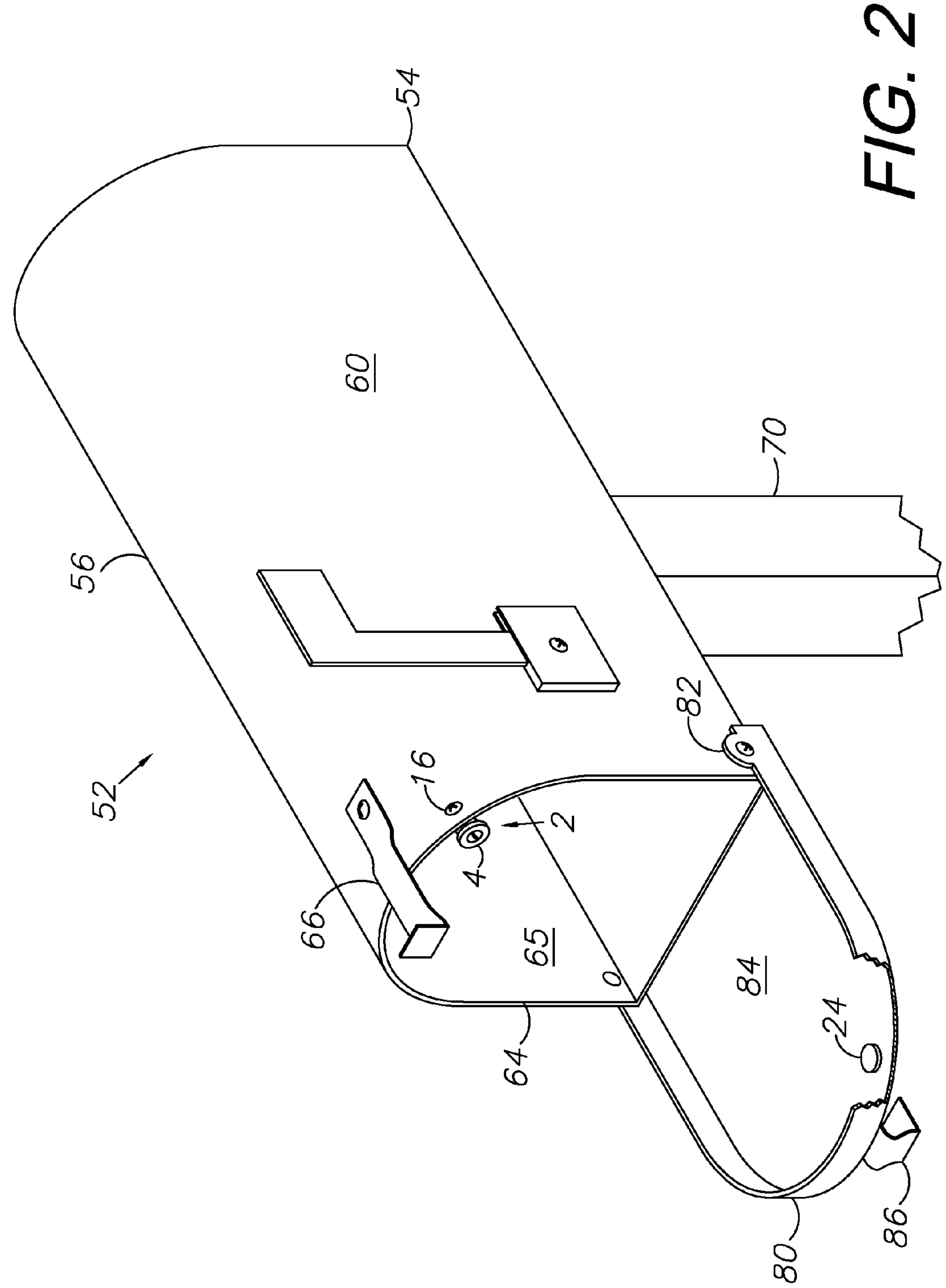
FIG. 2 is an upper, right, front isometric view of the door latch installed on a mailbox.
Figure 3:
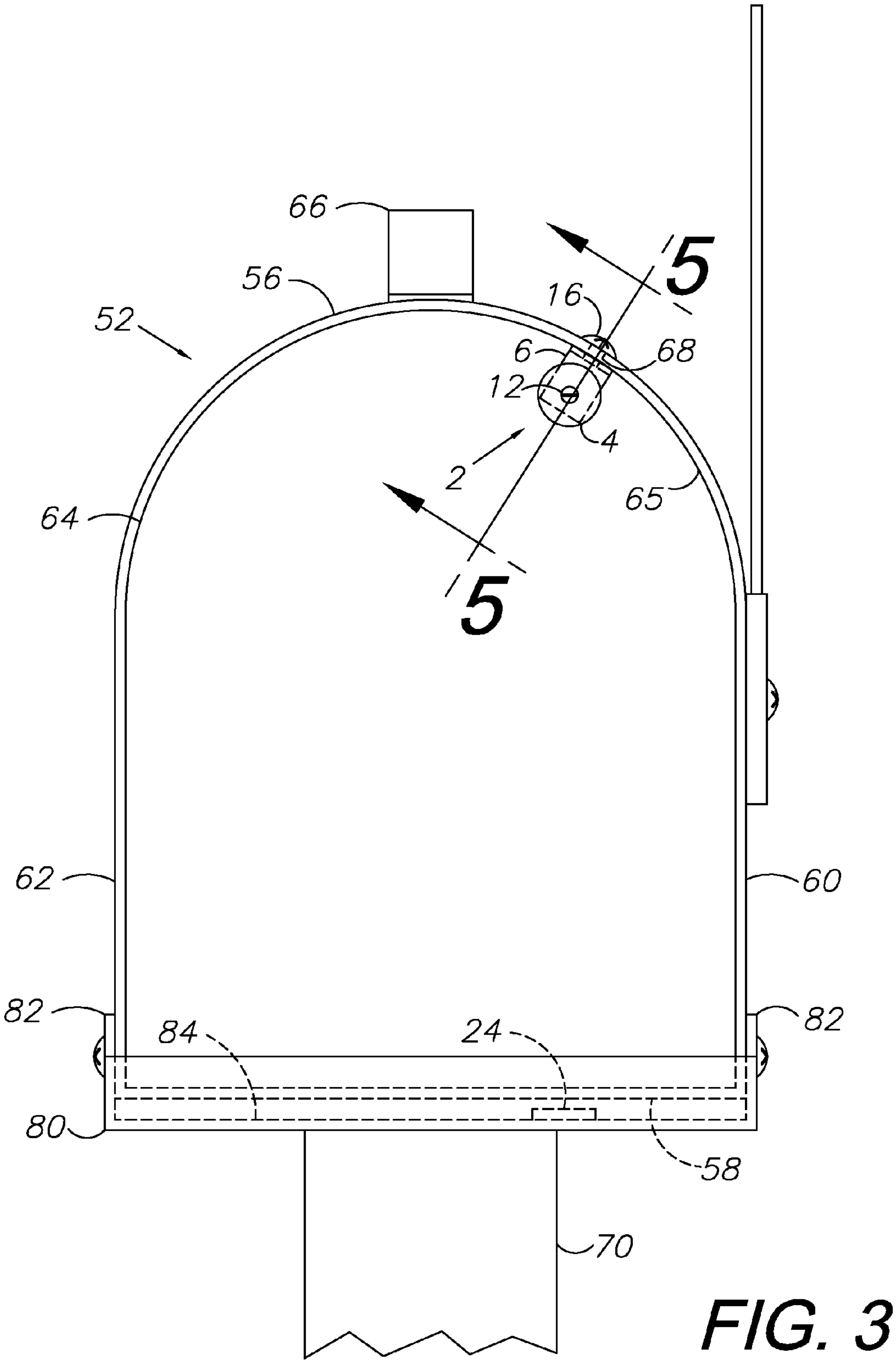
FIG. 3 is front view of the door latch installed on a mailbox.
Figure 4:
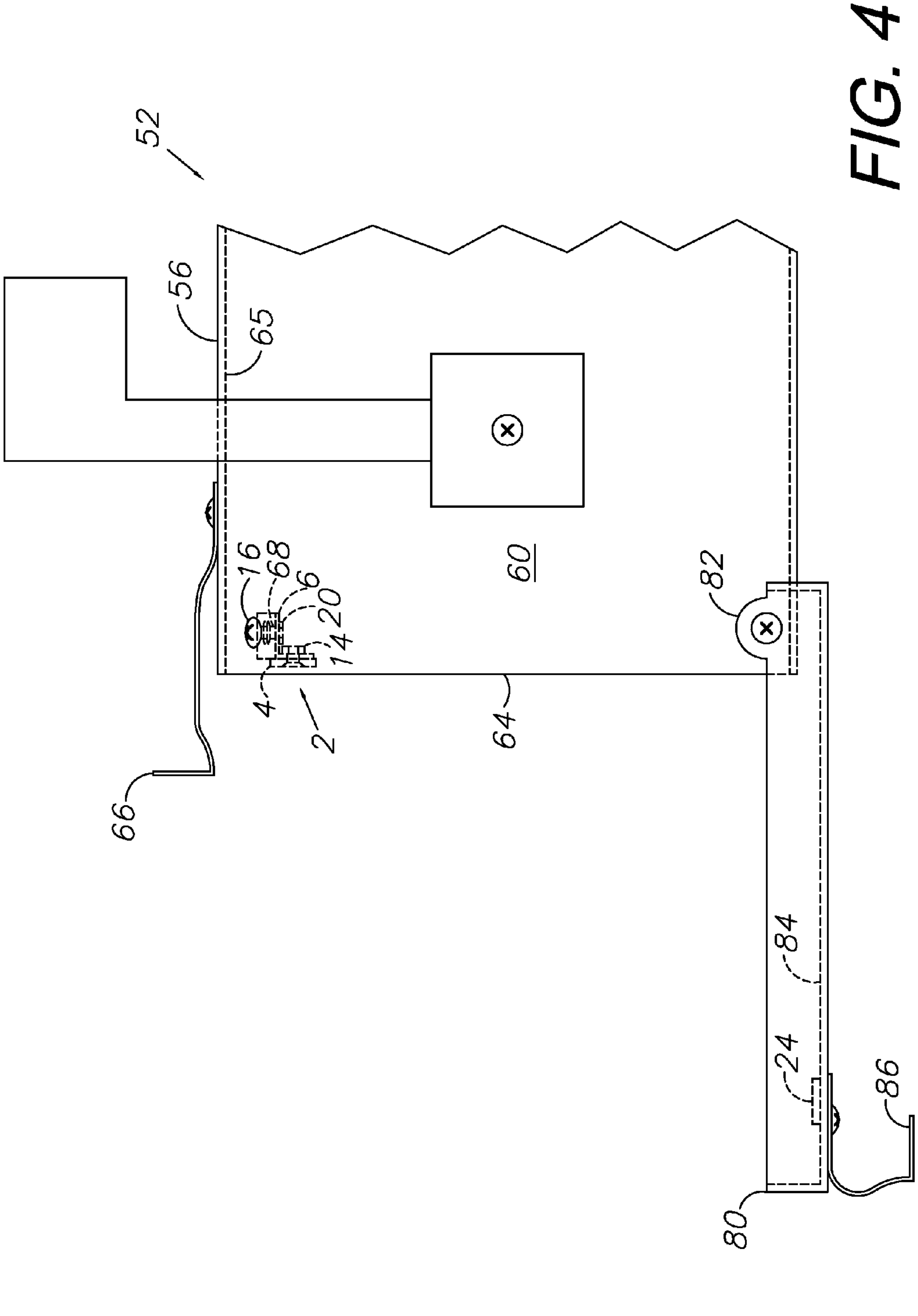
FIG. 4 is a right elevational view of the door latch installed on a mailbox.
Figure 5:
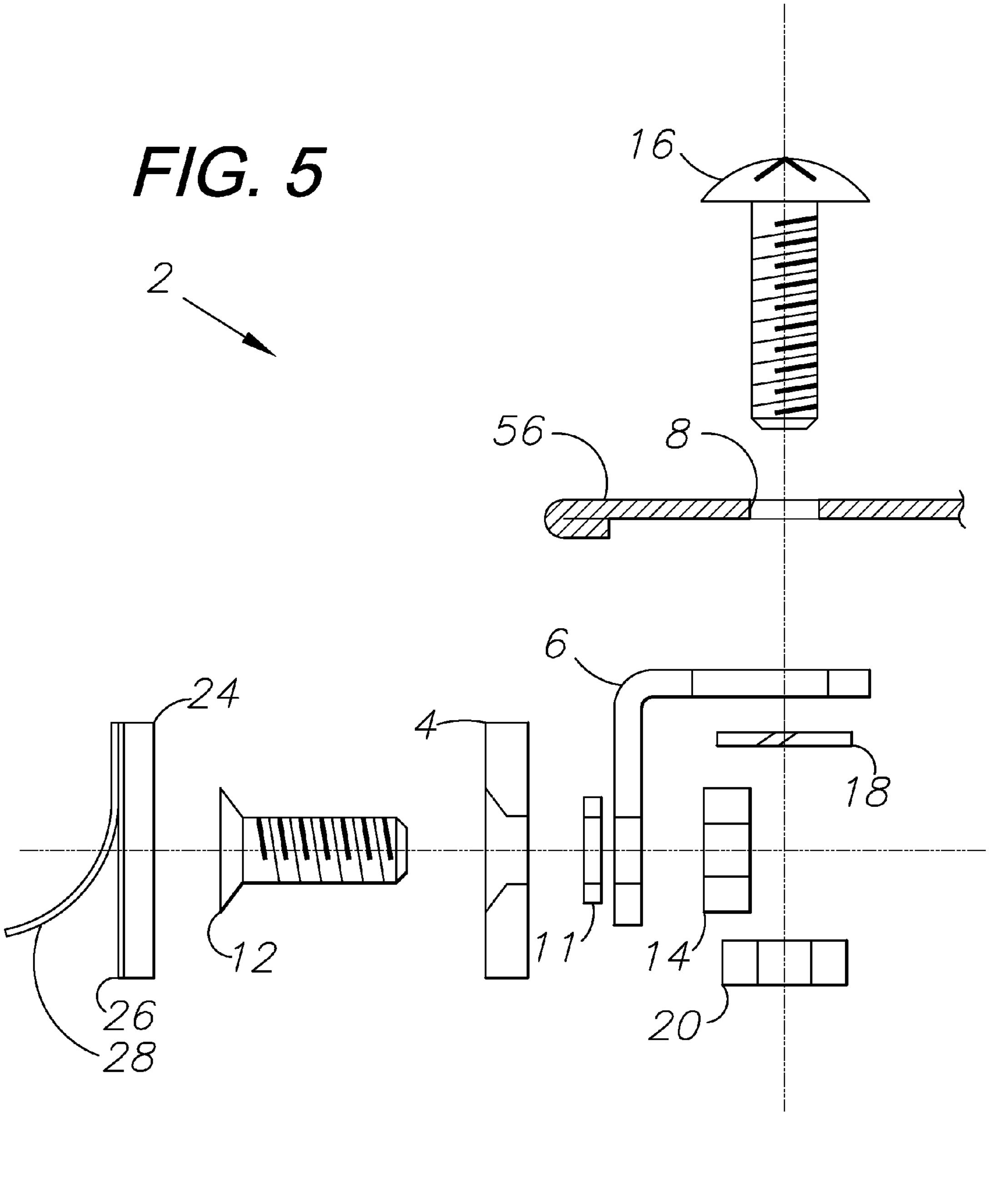
FIG. 5 is an exploded, side elevational view of the magnetic latch repair kit, taken generally along line 5-5 in FIG. 3.

Referring to FIGS. 2-4, the kit 2 is shown whereby the magnet 4 is attached to the mailbox 52 mounted on the bottom 58 to a post 70, and a disk 24 is attached to a downward-opening door 80 with a hinge 82. The magnet 4 is positioned on either side of the latch 66 on the body 54. The kit 2 is shown attached to the right of the latch 66 on the top 56 of the mailbox 52 toward the right side 60 of the body 54, but may be attached to the left of the latch 66 on the left side 62 of the body 54.

For mailboxes 52 that have a ferrous-containing door 80, the contact surface for the aforementioned magnet 4 and bracket 6 assembly is sufficient to secure the door 80. When the kit 2 is installed on a mailbox 52 that has a non-ferrous door 80, for example an aluminum or plastic door, the repair method involves using a ferrous metal (e.g., steel) disk or flat washer 24 as the contact surface for the magnet 4 and attached to the inner face 84 of the door 80 in alignment with the magnet 4. The disk 24 has doubled-sided tape 26 and is attached to the inner face 84 of the door 80 by removing a backing 28 and placing the tape 26 in contact with the door 80. Once the kit 2 is installed, the door 80 may be closed, thus engaging the latches 86, 66, and brining the magnet 4 into contact with the inner face 84 of a ferrous-containing door 80, or into contact with the disk 24 on a non-ferrous containing door 80. The alignment of the bracket 6 may be adjusted to ensure proper contact by the magnet 4 with the contact surface by loosening the nut 20 and sliding the bracket inward and outward within the opening 64 in the mailbox body 54 and re-securing the nut 20. The kit 2 insures that the door 80 remains closed in the event the latches 66, 86 are damaged or missing, or do not keep the door 80 closed. The kit 2 may also be used on mailboxes 52 that have doors 80 that do not have latches 66, 86, such as doors with pull handles, etc.

It is to be understood that while certain aspects of the disclosed subject matter have been shown and described, the disclosed subject matter is not limited thereto and encompasses various other embodiments and aspects.

Having thus described the invention, what is claimed as new and desired to be secured by Letters Patent is:

1. A system for retrofitting a mailbox closure, said system comprising:

the mailbox including a mailbox body, a latch, a latch receiver, a door, a door hinge, and a post;

said mailbox body comprising a top, a bottom, a right side, a left side, and an inner service, said mailbox top, bottom, and sides forming an opening, and said mailbox body placed atop said post;

said latch receiver adapted for receiving said latch;

said door including a door inner face, and said door being attached to said mailbox bottom by said door hinge;

a mailbox retrofit closure including a magnet with a magnet receiver opening, a bracket, a first screw, a second screw, a lock washer, a first nut, and a second nut;

said bracket including a slot, wherein said slot is adapted for receiving said first screw;

said bracket further including a bracket receiver opening, wherein said bracket receiver opening is adapted for receiving said second screw, and said second screw is secured to said bracket by said second nut;

wherein said magnet is secured to said bracket by inserting said second screw through said magnet receiver opening, through said bracket receiver opening, and said second nut;

wherein said bracket is attached to said mailbox body by said first screw, and is secured to said first screw by said lock washer and said first nut; and wherein said door is secured to said mailbox body by engaging said latch with said latch receiver, and by bringing said door inner face into contact with said magnet.

2. The system of claim 1 wherein said door is comprised of a ferrous material capable of being magnetically secured by said magnet.

3. The system of claim 1 further comprising:

a disk comprised of a ferrous metal;

said disk including an adhesive covered by a removable backing;

wherein said disk is attached to said door with said adhesive; and wherein said door is secured to said mailbox body by bringing said disk into contact with said magnet.

4. A method of retrofitting a mailbox including a top, a bottom, a right side, a left side, a latch, a latch receiver, a door, and a door hinge with a magnetic latch, said method comprising the steps:

providing a magnet with a magnet receiver opening, providing a bracket, including a bracket slot and a bracket receiver opening;

providing a first screw, a second screw, a lock washer, a first nut, and a second nut;

securing said bracket to said mailbox top by inserting said first screw through said bracket, through said mailbox top surface, through said lock washer, and through said first nut;

securing said magnet to said bracket by inserting said second screw through said magnet receiver opening, through said bracket receiver opening, and through said second nut; and securing said door by engaging said latch with said latch receiver and by bringing the inner face of said door into contact with said magnet.

5. The method of claim 4 wherein said door is comprised of a ferrous material capable of being magnetically secured by said magnet.

6. The method of claim 4 further comprising the steps:

providing a disk comprised of a ferrous metal;

providing an adhesive covered by a removable backing to said disk;

attaching said disk to said door with said adhesive; and securing said door by bringing said disk into contact with said magnet.

* * * * *